(12) United States Patent
Hoffjann et al.

(10) Patent No.: US 7,592,084 B2
(45) Date of Patent: Sep. 22, 2009

(54) AEROPLANE DRINK DISPENSER

(75) Inventors: Claus Hoffjann, Hamburg (DE); Andreas Westenberger, Buxtehude (DE)

(73) Assignee: Airbus Deutschland GmbH, Hamburg (DE)

( * ) Notice: Subject to any disclaimer, the term of this patent is extended or adjusted under 35 U.S.C. 154(b) by 516 days.

(21) Appl. No.: 11/560,695

(22) Filed: Nov. 16, 2006

(65) Prior Publication Data
US 2007/0119863 A1   May 31, 2007

(30) Foreign Application Priority Data
Nov. 17, 2005  (DE) ........................ 10 2005 054 883

(51) Int. Cl.
*H01M 8/06* (2006.01)
(52) U.S. Cl. .................. 429/26; 222/129.1; 222/146.5; 429/12; 429/30
(58) Field of Classification Search ............. 222/129.1, 222/129.3, 129.4, 146.1, 146.2, 146.5; 429/9, 429/12, 24, 26
See application file for complete search history.

(56) References Cited

U.S. PATENT DOCUMENTS

| 3,735,898 | A  | * | 5/1973 | Smith ....................... 222/129.4 |
| 7,044,335 | B2 | * | 5/2006 | Aguirre et al. ............ 222/129.1 |
| 7,108,229 | B2 | * | 9/2006 | Hoffjann et al. .............. 429/12 |
| 2004/0120008 | A1 | | 6/2004 | Morgan |
| 2005/0266287 | A1 | * | 12/2005 | Hoffjann et al. .............. 429/26 |
| 2007/0110861 | A1 | * | 5/2007 | Hoffjann et al. ............ 426/412 |
| 2007/0111066 | A1 | * | 5/2007 | Hoffjann et al. .............. 429/26 |
| 2008/0041233 | A1 | * | 2/2008 | Bunn ....................... 222/146.5 |

FOREIGN PATENT DOCUMENTS

| DE | 10142125 A1 | 3/2003 |
| DE | 102004010937 A1 | 9/2005 |
| JP | 2003275703 A  * | 9/2003 |

* cited by examiner

*Primary Examiner*—Kevin P Shaver
*Assistant Examiner*—Jonathan Wood
(74) *Attorney, Agent, or Firm*—Wood, Herron & Evans, LLP

(57) ABSTRACT

A drink dispenser which is particularly suitable for use on board a passenger plane, comprises a drink preparation unit and a supply unit. The supply unit has a fuel cell system with a fuel cell and is configured to supply the drink preparation unit with water, electric energy, and thermal energy produced by the fuel cell.

12 Claims, 1 Drawing Sheet

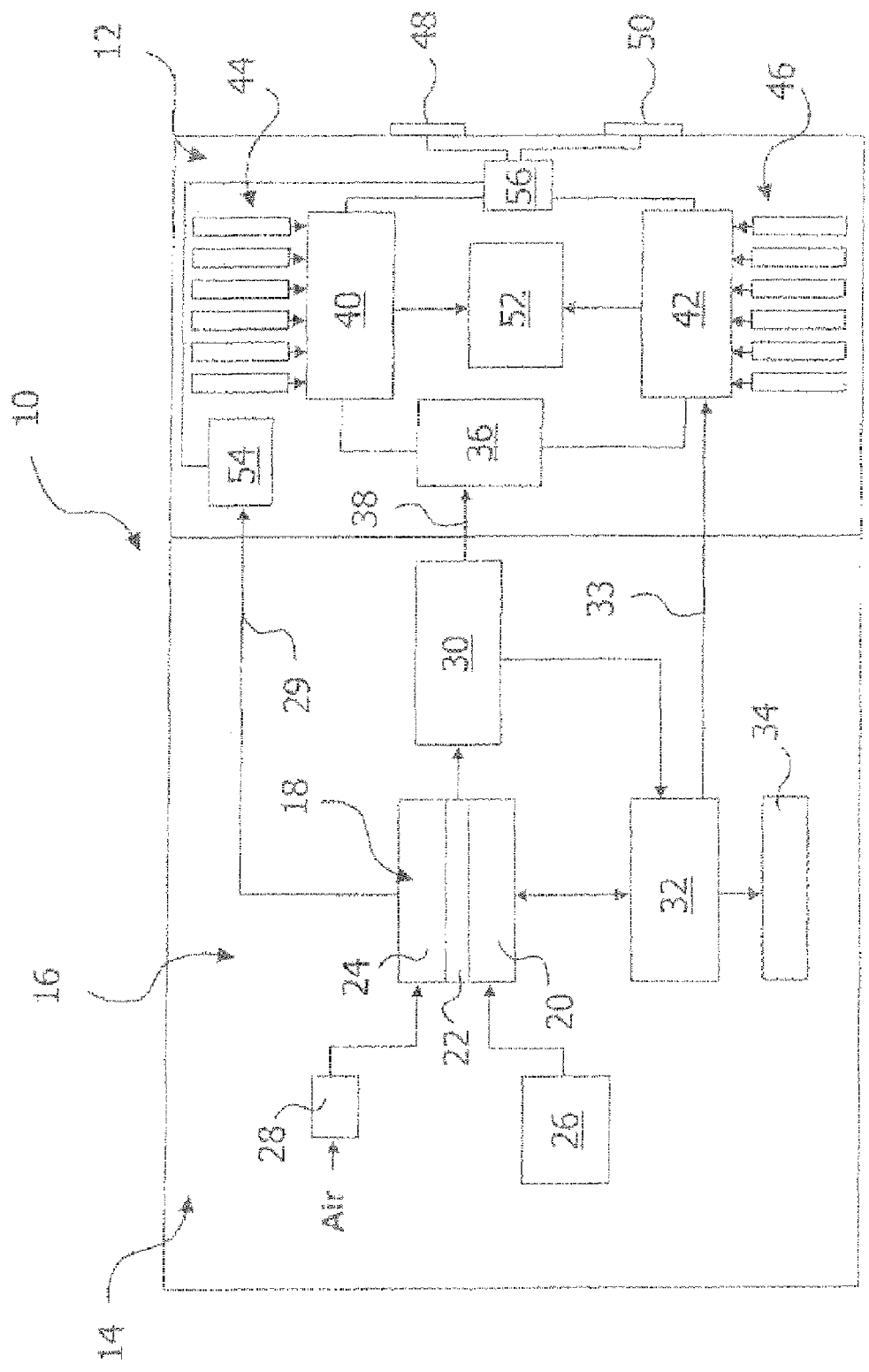

AEROPLANE DRINK DISPENSER

BACKGROUND OF THE INVENTION

The invention relates to a drink dispenser and to a drink dispenser system, which are particularly suitable for use on board a passenger plane.

At present, it is customary on board passenger planes for the passengers to be served with cold drinks filled for transportation in bottles, cans or other containers, as well as hot drinks prepared on board the aeroplane, such as coffee or tea. Particularly in the case of cold drinks, such as mineral water, juices or soft drinks which must be available in sufficiently large amounts especially on long-haul flights, a relatively large loading volume must therefore be provided in the passenger cabin of the aeroplane. Moreover, these drinks are relatively heavy. Finally, loading the drinks and unloading and disposing of the empty drink packaging after the flight is time-consuming and cost-intensive. Hot drinks have to be prepared by the flight attendants in the galley in a relatively expensive manner.

DE 101 42 125 A1 discloses a method for the supply of water for aeroplanes, wherein electric current and water are produced as required using a fuel cell. The water produced by the fuel cell may be used directly as service water or, after the addition of electrolytes/minerals, is suitable as drinking water.

US 2004/0120008 A1 discloses a digital photo kiosk, the electronic components of which are supplied with energy by a fuel cell.

SUMMARY OF THE INVENTION

DE 10 2004 010 937 A1 describes the use of a fuel cell for producing water on board an aeroplane. The water produced by the fuel cell may be used directly for flushing toilets and/or for humidifying the cabin. Drinking water may also be obtained by adding minerals.

The object of the invention is to provide a drink dispenser and a drink dispenser system which allow a simple and energy-efficient preparation of drinks and are particularly suitable for use on board a passenger plane.

To achieve the above-mentioned object, a drink dispenser according to the invention has a drink preparation unit comprising a mixing device for producing hot drinks by mixing a drink concentrate with water, and a supply unit. The supply unit comprises a fuel cell system with a fuel cell and a heat management arrangement. The fuel cell of the fuel cell system is connected to the drink preparation unit in order to supply the drink preparation unit with water and electrical energy which are both produced by the fuel cell. The heat management arrangement is connected to the mixing device to supply the mixing device with the thermal energy generated by the fuel cell and required to produce hot drinks.

The fuel cell system may either be part of the drink preparation unit or be installed elsewhere outside this unit. The latter solution would be particularly favourable if the drink preparation unit was a mobile unit comprising a water storage means which is refilled with water produced by the fuel cell and optionally stored temporarily, in a parked position of the drink preparation unit. It would also be possible to continuously supply a mobile drink preparation unit with water using a hose connection.

The fuel cell used in the supply unit of the drink dispenser according to the invention comprises a cathode region and an anode region separated from the cathode region by an electrolyte. During operation of the fuel cell, hydrogen is fed to the anode side of the fuel cell and an oxygenic oxidising agent, for example air, is fed to the cathode side of the fuel cell. The hydrogen molecules react at an anode catalyst in the anode region according to the equation:

$$H_2 \rightarrow 2.H^+ + 2.e^-$$

and in so doing release electrons to the electrode with the formation of positively charged hydrogen ions.

The $H^+$-ions formed in the anode region then diffuse through the electrolyte to the cathode where they react at a cathode catalyst which is in the cathode region and is typically applied to a carbon carrier with the oxygen fed to the cathode and the electrons guided to the cathode via an external circuit according to the equation:

$$0.5.O_2 + 2.H^+ + 2.e \rightarrow H_2O$$

to produce water. The operating temperature of the fuel cell depends on the type of electrolyte used in the fuel cell. For example, the operating temperature of a conventional polymer electrolyte membrane fuel cell is from approximately 60 to 80° C.

A particular advantage of the drink dispenser according to the invention is that the water resulting as a reaction product during operation of the fuel cell may be optimally used for the preparation of drinks in the drink preparation unit. This allows the drink dispenser to be operated in a particularly energy-efficient manner.

It is basically possible to produce water of drinking quality in a fuel cell. Requirements for this provision are an adequate purity of the starting materials supplied to the fuel cell and a configuration, which is as germ-free and food-safe as possible, of the relevant components of the fuel cell system which come into contact with the starting materials supplied to the fuel cell and the water produced by said fuel cell. Therefore, in the drink dispenser according to the invention, the relevant components of the supply unit are preferably kept as clean, germ-free and food-safe as possible. This ensures that the drink preparation unit of the drink dispenser is always supplied with drinking water of a consistently high quality.

In the drink dispenser according to the invention, the energy generated by the fuel cell, i.e. the electrical energy generated during operation of the fuel cell and/or the thermal energy produced during operation of said fuel cell, may be supplied to the drink preparation unit and thus used for the preparation of drinks. For example, electrical energy generated by the fuel cell may be used for driving electrical consumers in the drink preparation unit, for example an electronic control unit, a pump or a cooling system. On the other hand, thermal energy generated by the fuel cell may be directly used, for example for the preparation of hot drinks.

The supply unit may be exclusively provided for supplying water and, if required, energy as well to the drink preparation unit of the drink dispenser according to the invention. Alternatively, however, the supply unit may also be part of a separate or superimposed energy and/or water supply system and may supply water and/or energy both produced by the fuel cell to other systems as well, preferably systems on board an aeroplane, in addition to the drink preparation unit of the drink dispenser according to the invention.

The drink preparation unit of the drink dispenser according to the invention may be used to produce only one type of drink. For example, the drink preparation unit may be configured so that the drink dispenser according to the invention can dispense only drinking water. However, the drink preparation unit is preferably capable of producing various types of drinks, for example various types of soft drinks and optionally also hot drinks.

The drink preparation unit of the drink dispenser according to the invention preferably comprises at least one mixing device for mixing a drink concentrate with water. For this purpose, the mixing device may be connected to a reservoir containing a drink concentrate, said drink concentrate being present in liquid or solid form, i.e. for example in. the form of a syrup or a powder. The mixing device is, however, preferably connected to a plurality of reservoirs containing various types of drink concentrates in this case, the drink preparation unit may also comprise a selection device, via which the user may select the drink to be produced by the mixing device. The drink selected via the selection device and prepared in the drink preparation unit may then be dispensed to the user via a dispensing device, configured for example in the form of a dispensing chute, of the drink preparation unit.

When the drink dispenser according to the invention is used on board a passenger plane, a considerable saving in terms of weight may be realised using concentrates for preparing drinks as required, compared to using drinks provided in bottles, cans or other packaging. Moreover, the volume required for loading drinks in the passenger cabin of the aeroplane is significantly reduced. Another advantage is that the passengers on board the aeroplane may be provided at any time and without great expense with the drinks of their choice.

The drink concentrate/water mixture produced in the mixing device may be mixed with other liquid, solid or gaseous substances, for example milk, sugar or $CO_2$, either directly in the mixing device or in a device connected downstream of the mixing device. If the other liquid, solid or gaseous substances are added directly into the mixing device, said mixing device is connected to corresponding reservoirs containing these substances. Moreover, the drink preparation unit may be configured such that a user may himself also select via the selection device the addition of the other substances to the drink to be produced by the drink preparation unit.

The mixing device may be supplied with the liquid required for the drink preparation by the water produced by the fuel cell of the supply unit. If the mixing device comprises electrical consumers, said mixing device may also be supplied with electrical energy produced by the fuel cell of the supply unit. Finally, the mixing device may be heated or cooled, for example to produce hot or cold drinks, it being possible for the electrical energy generated by the fuel cell or, when heating is involved, the thermal energy generated by the fuel cell to also be directly used for this purpose.

In a particularly preferred embodiment of the drink dispenser according to the invention, the drink preparation unit comprises two mixing devices, a first mixing device being used to produce cold drinks and a second mixing device being used to produce hot drinks. The drink preparation unit may then have either a central selection device to select the desired drink or two separate selection devices, associated with the respective mixing devices, to select the desired hot drink or to select the desired cold drink, respectively.

The drink preparation unit of the drink dispenser according to the invention preferably comprises a storage container for holding the water produced by the fuel cell of the supply unit. The storage container may be connected, for example, to the mixing device of the drink preparation unit in order to supply water, necessary for the drink preparation, to the mixing device. Depending on requirements, the storage container may be heated or cooled, it being possible for the electrical energy generated by the fuel cell of the supply unit or, when heating is involved, the thermal energy generated by the fuel cell to also be directly used for this purpose. Alternatively or additionally, the storage container may also be provided with a suitable insulation which, optionally without additional heating, can keep water removed from the fuel cell of the supply unit at the temperature required for the preparation of hot drinks.

The drink preparation unit of the drink dispenser according to the invention only has to have a single storage container for water which, however, if necessary may be connected to a plurality of mixing devices in order to supply water, required for the drink preparation, to the mixing devices. If different mixing devices, used respectively for the production of hot or cold drinks, are supplied with water by a common storage container, it may be necessary to heat or cool the water required for the drink preparation after it has been removed from the storage container, for example in the mixing device, to the temperature required for the preparation of the respective desired hot or cold drinks.

Alternatively, the drink preparation unit of the drink dispenser according to the invention may also comprise a plurality of storage containers for water. For example, a first suitably insulated and/or heated storage container may be provided which supplies hot water required for the drink preparation to a mixing device to produce hot drinks. Moreover, a mixing device to produce cold drinks may be connected to a second storage container, wherein said second storage container may be cooled, if necessary, so that the water supplied to the mixing device to produce cold drinks is already at the required cool temperature.

An energy storage means to store the energy produced by the fuel cell of the supply unit is preferably provided in the drink preparation unit of the drink dispenser according to the invention. The energy storage means configured, for example, in the form of a rechargeable battery can preferably be connected electrically to the fuel cell of the supply unit, so that it may be recharged as required by the electrical energy produced by the fuel cell. The provision of an energy storage means in the drink preparation unit also allows the drink preparation unit to be operated independently of the supply unit at least for a certain time, even if it comprises electrical consumers, for example an electronic control unit, a pump, a cooling is system or an electrical heating means.

The fuel cell used in the supply unit of the drink dispenser according to the invention is preferably a polymer electrolyte membrane fuel cell, a high-temperature polymer electrolyte membrane fuel cell being used in a particularly preferred embodiment of the drink dispenser according to the invention. In principle, polymer electrolyte membrane fuel cells have the advantage that they are relatively simple to produce since the membrane films used as the electrolyte are relatively non-sensitive and may be handled in an uncomplicated manner. Furthermore, the electrolyte is not consumed during operation of the fuel cell and therefore does not have to be replaced or reprocessed during the service life of the cell. Moreover, polymer electrolyte membrane fuel cells have a relatively long service life and finally they may be started up and disconnected in a relatively simple and fast manner.

High-temperature polymer electrolyte membrane fuel cells differ from conventional polymer electrolyte membrane fuel cells by the type of electrolyte membrane which is used in the fuel cell and which allows elevated operating temperatures of approximately 120° C. to 300° C., depending on the composition thereof, compared to conventional polymer electrolyte membrane fuel cells. In the drink dispenser according to the invention, the use of a high-temperature polymer electrolyte membrane fuel cell has the advantage that the water resulting during the fuel cell reaction is already sterilised in the cell at the elevated operating temperature of this cell.

In a preferred embodiment of the drink dispenser according to the invention, the fuel cell system of the supply unit comprises a hydrogen tank connected to an anode region of the fuel cell. The hydrogen tank is ideally suited for holding liquid or partly-solidified hydrogen and may comprise, for example, an inner container with a steel or aluminum wall surrounded by one or more thermally insulating layers. The inner container of the liquid hydrogen tank may be positioned in an outer housing made of steel or aluminum, it being possible for the space between the inner container and the outer housing to be filled with materials which are poor conductors of heat.

The storage temperature of liquid hydrogen is approximately −253° C., which has the advantage, particularly when liquid hydrogen is used as the propellant for a fuel cell system on board an aeroplane, that the hydrogen tank may be accommodated outside the cabin in the unheated loading area of the aeroplane, without the ensuing problem of the propellant freezing. Moreover, liquid hydrogen may be obtained in a very high purity, which has a positive effect on the quality of the water produced by the reaction of the hydrogen in the fuel cell.

Alternatively, the hydrogen tank may also be a pressurised storage means suitable for storing hydrogen gas under elevated pressure and may have, for example, an inner container made of aluminum and sheathed with carbon fibres and an outer container made of plastics material.

As another alternative, the fuel cell system of the supply unit in the drink dispenser according to the invention may also comprise a device, connected to the anode region of the fuel cell, to produce hydrogen from a hydrogenous medium. For example, a reforming plant to produce hydrogen from hydrocarbons, for example methanol, may be provided.

The fuel cell system of the supply unit may preferably also comprise a device which is connected to the cathode region of the fuel cell and is used for supplying an oxygenic medium to the cathode region of the fuel cell. This device may comprise, for example, an oxygen supply line connected to the cathode region of the fuel cell and a compressor positioned in the oxygen supply line or a pump positioned in the oxygen supply line. The oxygenic medium supplied to the cathode region of the fuel cell is preferably air which may be drawn by suction, for example, from the cabin of the aeroplane by the compressor or the pump. Alternatively, however, air may also be supplied to the cathode region of the fuel cell directly from the air-conditioning system of the aeroplane. Finally, it is also possible to supply pure oxygen contained in a suitable storage means to the cathode region of the fuel cell.

In a preferred embodiment of the drink dispenser according to the Invention, the supply unit comprises a condensation device for condensing water vapour issuing from the fuel cell. Even when a conventional polymer electrolyte membrane fuel cell is used, the operating temperature of this cell reaches 80° C., so that the water produced during the fuel cell reaction is in the form of very moist air (relative air humidity 100%). When a high-temperature polymer electrolyte membrane fuel cell is used which may be operated at temperatures of up to 300° C., the water issuing from the fuel cell is in the form of water vapour. The condensation device connected downstream of the fuel cell converts the gaseous water vapour into the liquid state and simultaneously cools the liquid water to the required temperature.

The condensation device preferably comprises a condensation region and a collecting region for holding the liquid water produced in the condensation device, it being possible for the collecting region to have a suitably large volume in order to be able to temporarily store a certain amount of liquid water as required.

The condensation device may preferably be connected to the storage container of the drink preparation unit, so that the storage container may be filled as required with the water produced by the condensation device or the water temporarily stored in the collecting region of the condensation device. If the drink preparation unit does not have a storage container, the condensation device may also be connected directly to the mixing device or mixing devices of the drink preparation unit.

As already mentioned, it is possible in principle to produce water of drinking quality by a fuel cell reaction, provided that the starting materials supplied to the fuel cell are of an adequate purity and the components of the fuel cell system and the condensation device are sufficiently clean, germ-free and food-safe. In order to ensure that the water supplied to the drink preparation unit of the drink dispenser according to the invention is of a sufficiently high quality, a device for detecting the quality of the water produced by the fuel cell may be provided in the supply unit. This device which, for example, may be connected downstream of the condensation device or integrated into the condensation device is preferably capable of testing the water produced by the fuel cell in respect of various selected constituents.

If necessary, the supply unit of the drink dispenser according to the invention may also comprise a water treatment device which ensures that the water supplied to the drink preparation unit is of drinking quality, for example by adding certain components to or separating certain components from the water produced by the fuel cell.

The heat management arrangement of the supply unit of the drink dispenser according to the invention is preferably used to control the operating temperature of the fuel cell and/or the operating temperature of the condensation device and thus the temperature of the water produced by the condensation device. For example, the heat management arrangement may comprise a cooling system for cooling the fuel cell during operation, it being possible for the fuel cell waste heat to be recovered via the provision of heat exchangers in the cooling system and to be used for heating a mixing device or a storage container of the drink preparation unit. Similarly, waste heat produced in the condensation device during the condensation of water vapour produced by the fuel cell may be removed from the condensation device via a suitable system forming an element of the heat management arrangement and may be used, if appropriate, for heating a mixing device or a storage container of the drink preparation unit. Excess heat which is produced during operation of the fuel cell and which cannot be further used by the heat management arrangement may be carried away into the environment via an external cooler.

In a particularly preferred embodiment of the drink dispenser according to the invention, the drink preparation unit and the supply unit are configured as separate components which, however, may be connected together and separated from each other as required. For examples the drink preparation unit may be configured as a mobile component, for example in the form of a trolley, while the supply unit may be provided in the form of a stationary base or docking station. The drink preparation unit may then be used in a particularly convenient manner, for example on board an aeroplane, to provide the seated passengers with their requested drinks. When it is necessary to refill the storage container of the drink preparation unit with water or to recharge the energy storage means contained in the drink preparation unit, the drink preparation unit may be connected to the supply unit and the storage container may be refilled with water produced by the fuel cell of the supply unit and the energy storage means may be recharged with electrical energy generated by the fuel cell. Furthermore, a component, heated by thermal energy produced by the fuel cell of the supply unit, of the drink preparation unit, for example a mixing device or a storage container, may be brought back to the required temperature when the drink preparation unit is connected to the supply unit.

A drink dispenser system according to the invention comprises a plurality of mobile drink preparation units which may be configured in each case as described above, i.e. they may comprise a mixing device for producing hot drinks by mixing a drink concentrate with water and may also have a storage container and/or an energy storage means. The drink dispenser system according to the invention also comprises at least one stationary supply unit which is connectable to the mobile drink preparation units, it naturally also being possible to equip the drink dispenser system according to the invention with a plurality of stationary supply units distributed at various points, for example in the passenger cabin of an aeroplane. The or each stationary supply unit of the drink dispenser system according to the invention comprises a fuel cell system with a fuel cell and a heat management arrangement The fuel cell of the fuel cell system is connectable to the mobile drink preparation units in order to supply the plurality of mobile drink preparation units with water and energy, both produced by the fuel cell. The heat management arrangement is connectable to the mixing devices in order to supply said mixing devices with the thermal energy produced by the fuel cell and required to prepare the hot drinks. Furthermore, the or each stationary supply unit of the drink dispenser system according to the invention may be configured as described above in connection with the drink dispenser according to the invention, i.e. they comprise a polymer electrolyte membrane fuel cell, preferably a high-temperature polymer electrolyte membrane fuel cell, a condensation device, a device for assessing the water quality and/or a water treatment device.

If the drink dispenser system according to the invention has a plurality of stationary supply units, each stationary supply unit may be equipped with a fuel cell system, as described above. Alternatively, it is however also possible to provide a central fuel cell system and to connect it to a plurality of stationary supply units. Furthermore, it is also possible to allocate a separate fuel cell to a plurality of stationary supply units, but to supply these separate fuel cells with hydrogen and/or an oxygenic medium via a common hydrogen tank or a common device for producing hydrogen from a hydrogenous medium and/or via a common device for supplying an oxygenic medium.

BRIEF DESCRIPTION OF THE DRAWINGS

A preferred embodiment of the invention will now be described in more detail with reference to the single accompanying FIGURE showing a schematic illustration of a drink dispenser according to the invention.

DETAILED DESCRIPTION OF THE INVENTION

In the FIGURE, a drink dispenser 10 comprises a mobile drink preparation unit 12 configured as a trolley and a supply unit 14 configured as a stationary base or docking station. The drink preparation unit 12 is provided with fluid connection lines and electrical connections which may be connected to suitable connections provided on the supply unit 14. The drink preparation unit 12 may thus be easily separated from the supply unit 14 and may easily be connected, as required, to said supply unit 14.

The supply unit 14 comprises a fuel cell system 16 with a high-temperature polymer electrolyte membrane fuel cell 18. Although only a single fuel cell 18 is shown in the FIGURE, the fuel cell system 16 has a plurality of high-temperature polymer electrolyte membrane fuel cells 18 which are stacked one on top of the other to form a so-called fuel cell stack.

The fuel cell 18 comprises an anode region 20 which is separated from a cathode region 24 by an electrolyte 22 configured as a proton-conducting polymer film which is stable to heat up to approximately 300° C. The anode region 20 of the fuel cell 18 is connected to a liquid hydrogen tank 26 filled with very pure liquid hydrogen. The cathode region 24 of the fuel cell 18 is supplied by a compressor 28 with air which is removed from the passenger cabin or the air-conditioning system of the aeroplane when the drink dispenser 10 is used on board a passenger plane.

The starting materials hydrogen and atmospheric oxygen supplied to the fuel cell 18 are converted into water during operation of the fuel cell 18 while producing electrical energy which is removed from the fuel cell 18 via a line 29, the water being present in the form of water vapour at the operating temperature of the high-temperature polymer electrolyte membrane fuel cell 18 of approximately 300° C. The supply unit 14 therefore comprises a condensation device 30 for condensing the water vapour issuing from an outlet of the fuel cell 18 to produce liquid water. The condensation device 30 comprises a condensation region and a collecting region, said collecting region being used to temporarily store the liquid water produced in the condensation device 30.

A heat management arrangement 32 is used to control the operating temperatures of the fuel cell 18 and the condensation device 30 and comprises suitable cooling systems as well as one or more heat exchangers allowing the heat released by the fuel cell 18 and the condensation device 30 during operation via a line 33, to be further used. Excess waste heat from the fuel cell 18 and/or the condensation device 30 is released to the environment via an external cooler 34.

The mobile drink preparation unit 12 comprises a storage container 36 which may be connected via a line 38 to the condensation device 30 of the supply unit 14, so that the storage container 36 may be filled with the liquid water produced by the condensation device 30 when the drink preparation unit 12 is connected to the supply unit 14.

The storage container 36 is connected to a first and a second mixing device 40, 42 for mixing a drink concentrate with water, so that water may be supplied as required to the mixing devices 40, 42 from the storage container 36. Moreover, each mixing device 40, 42 is connected to a plurality of reservoirs 44, 46 containing various types of drink concentrates.

The first mixing device 40 is used for producing cold drinks and is also connected to a device (not shown in the FIGURE) for feeding $CO_2$ into the drink concentrate/water mixture produced by the mixing device 40. The second mixing device 42 is used for producing hot drinks and may therefore be connected to the heat management arrangement 32 of the supply unit 14 in order to heat the second mixing device 42, when the drink preparation unit 12 is connected to the supply unit 14, to a sufficiently high temperature for the production of hot drinks during the mobile operation of the drink preparation unit 12. Furthermore, the second mixing device 42 is connected to devices (not shown in the FIGURE) for feeding milk and sugar into the drink concentrate/water mixture.

The drink preparation unit 12 also comprises a first and second selection device 48, 50 for selecting the desired drink, the first selection device 48 being associated with the first mixing device 40 to produce cold drinks and the second selection device 50 being associated with the second mixing device 42 for producing hot drinks. A user may also select the addition of $CO_2$, milk or sugar to the desired drink via the selection devices 48, 50.

A dispensing device 52 is used for dispensing the drinks produced by the mixing devices 40, 42. Finally, the drink preparation unit 12 comprises a rechargeable battery 54 which may be connected to the line 29 of the supply unit 14 and an electronic control unit 56, supplied with electrical energy by the battery 54, to control the operation of the first and second mixing devices 40, 42.

The operating mode of the drink dispenser 10 will be described in the following. In the mobile operation of the drink preparation units 12, passengers on board an aeroplane are able to select via the selection devices 48, 50 their desired hot or cold drink with possibly, if also desired, the addition of $CO_2$, sugar or milk. Thereupon, the corresponding mixing device 40, 42 is activated by the electronic control unit 56, so that the desired drink is prepared by the drink preparation unit 12 and dispensed to the passenger via the dispensing device 52.

The water stored in the storage container 30 and drink concentrate from one or more of the concentrate reservoirs 44, 46 are used to produce the drink and are mixed in the corresponding mixing device 40, 42. Moreover, $CO_2$, sugar or milk are optionally supplied to the drink concentrate/water mixture.

If required, the mobile drink preparation unit 12 may be connected to the stationary supply unit 14. If the drink preparation unit 12 is connected to the supply unit 14, the fuel cell system 16 of the supply unit 14 is started up, so that water and electrical energy are produced by the fuel cell 18.

The electrical energy produced by the fuel cell 18 is supplied to the drink preparation unit 12 via the line 29 and used for recharging the battery 54. Moreover, the water produced by the fuel cell 18 and converted into the liquid state in the condensation device 30 is guided into the storage container 36 via the line 38. Finally, the second mixing device 42 is connected to the heat management arrangement 32 via the line 33 to produce hot drinks and consequently heated to an adequate temperature for allowing the mixing device 42 to prepare hot drinks during the mobile operation of the drink preparation unit 12.

The invention claimed is:

1. Aeroplane drink dispenser (10) with
 a drink preparation unit (12) comprising a mixing device (42) for preparing hot drinks by mixing a drink concentrate with water, and
 a supply unit (14) comprising a fuel cell system (16) with a fuel cell (18) and a heat management arrangement (32), wherein the fuel cell (18) of the fuel cell system (16) is connected to the drink preparation unit (12) to supply the drink preparation unit (12) with water and electrical energy which are both produced by the fuel cell (18), the heat management arrangement (32) being connected to the mixing device (42) to supply the mixing device (42) with thermal energy which is produced by the fuel cell (18) and is necessary to produce hot drinks.

2. Aeroplane drink dispenser according to claim 1, characterised in that the drink preparation unit (12) comprises a second mixing device (40) for producing cold drinks by mixing a drink concentrate with water.

3. Aeroplane drink dispenser according to claim 1, characterised in that the drink preparation unit (12) comprises a storage container (36) for holding the water produced by the fuel cell (18).

4. Aeroplane drink dispenser according to claim 1, characterised in that the drink preparation unit (12) comprises a dispensing device (52) for dispensing drinks prepared in the drink preparation unit (12) and a selection device (48, 50) for selecting the drink to be dispensed via the dispensing device (52).

5. Aeroplane drink dispenser according claim 1, characterised in that the drink preparation unit (12) comprises an energy storage means (54) for storing the energy produced by the fuel cell (18).

6. Aeroplane drink dispenser according to claim 1, characterised in that the fuel cell (18) is a polymer electrolyte membrane fuel cell, in particular a high-temperature polymer electrolyte membrane fuel cell.

7. Aeroplane drink dispenser according to claim 1, characterised in that the fuel cell system (16) comprises a hydrogen tank (26) connected to an anode region (20) of the fuel cell (18) or a device, connected to the anode region (20) of the fuel cell (18), for producing hydrogen from a hydrogenous medium.

8. Aeroplane drink dispenser according to claim 1, characterised in that the fuel cell system (16) comprises a device (28), connected to a cathode region (24) of the fuel cell (18), for feeding an oxygenic medium into the cathode region (24) of the fuel cell (18).

9. Aeroplane drink dispenser according to claim 1, characterised in that the supply unit (14) comprises a condensation device (30) for condensing water issuing from the fuel cell (18).

10. Aeroplane drink dispenser according to claim 1, characterised in that the heat management arrangement (32) is configured to control at least one of the operating temperature of the fuel cell (18) and the operating temperature of the condensation device (30).

11. Aeroplane drink dispenser according to claim 1, characterised in that the drink preparation unit (12) and the supply unit (14) are configured as separate components which may be connected together or separated from each other as required.

12. Aeroplane drink dispenser system with a plurality of mobile drink preparation units (12) which each comprise a mixing device (42) for producing hot drinks by mixing a drink concentrate with water, and at least one stationary supply unit (14) which is connectable to the mobile drink preparation units (12) and comprises a fuel cell system (16) with a fuel cell (18) and a heat management arrangement (32), wherein the fuel cell (18) of the fuel cell system (16) is connectable to the mobile drink preparation units to supply the plurality of mobile drink preparation units (12) with water and electrical energy, both produced by the fuel cell (18), and wherein the heat management arrangement (32) is connectable to the mixing devices (42) in order to supply said mixing devices (42) with thermal energy produced by the fuel cell (18) and required for the preparation of hot drinks.

* * * * *